INVENTOR
Heinz K. Mutterer
BY Arthur G. March
ATTORNEY

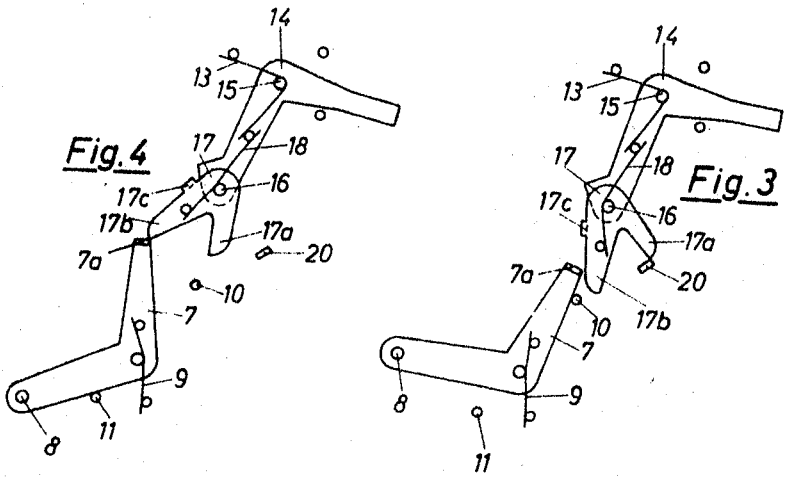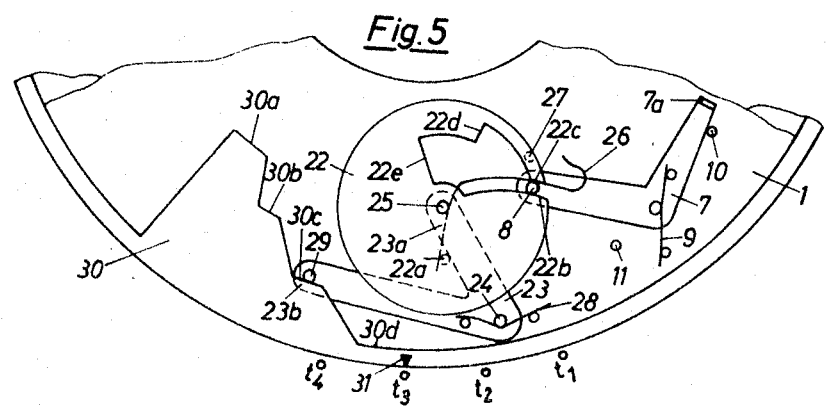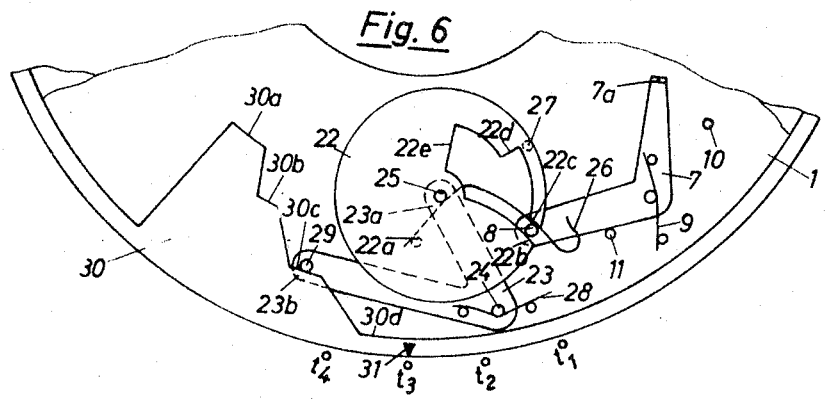

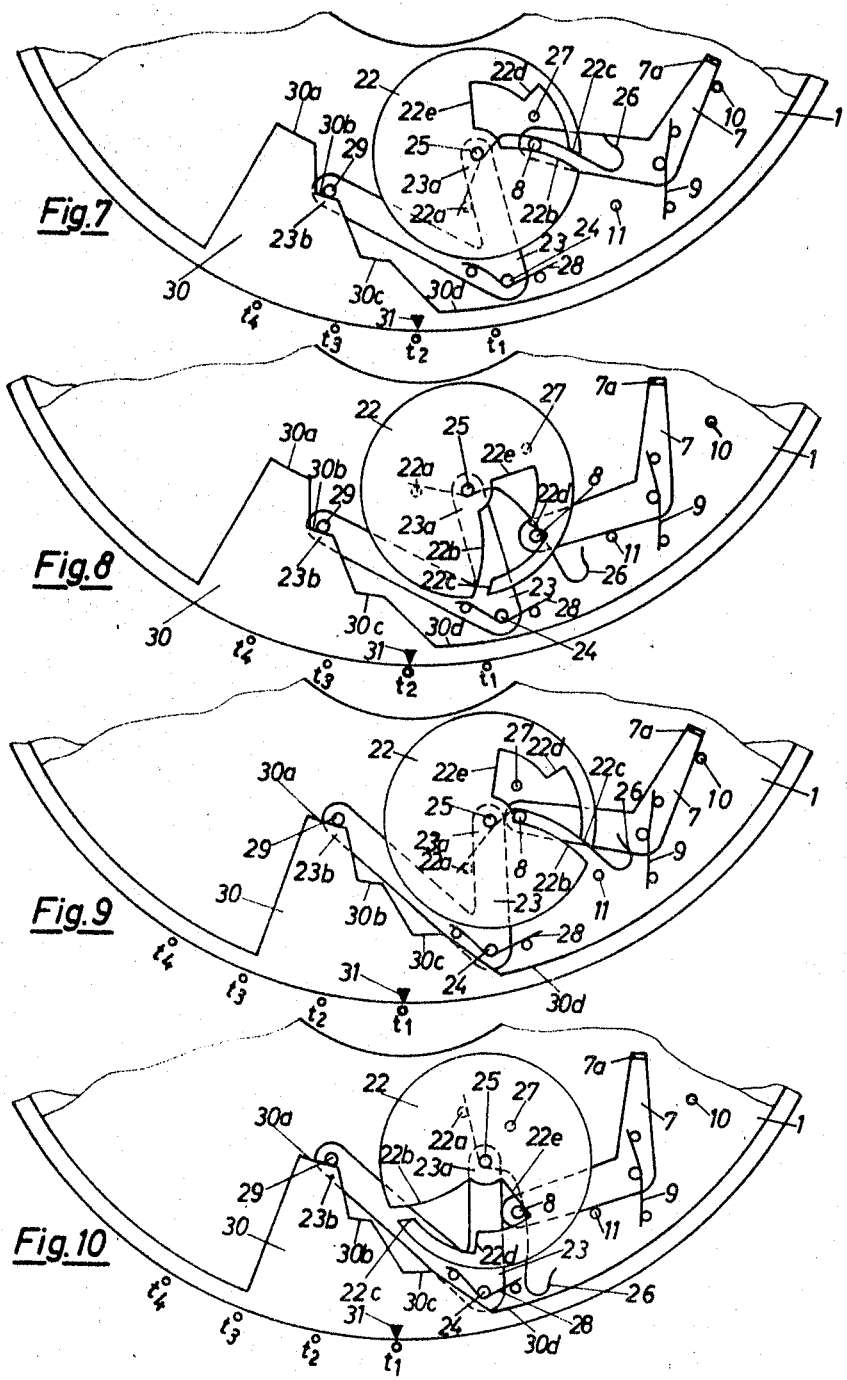

United States Patent Office 3,460,455
Patented Aug. 12, 1969

3,460,455
PHOTOGRAPHIC SHUTTER WITH A BRAKE WHEEL FOR EXPOSURE TIME REGULATION
Heinz Karl Mutterer, Sprollenhauss, Germany, assignor to Prontor-Werk Alfred Gauthier, G.m.b.H., Calmbach, Black Forest, Germany, a corporation of Germany
Filed Apr. 19, 1967, Ser. No. 631,940
Claims priority, application Germany, Apr. 20, 1966, P 39,231
Int. Cl. G03b 9/14
U.S. Cl. 95—62　　　　　　　　　　　　　　　9 Claims

ABSTRACT OF THE DISCLOSURE

A photographic shutter having one or more shutter blades and an actuating lever operably connected to the shutter blades for back and forth movement. The shutter has a braking member engageable with the actuating lever to influence its opening and closing motion for regulating the exposure time. The braking member is a pivotally mounted wheel rotatable against the force of a spring and has stop edges staggered like steps to limit its amplitude of deflection. A movable carrier is provided to mount the braking member, the carrier being movable to change its position relative to the actuating lever.

---

The invention relates to a photographic shutter, and particularly to a shutter which may be self-winding having one or more shutter blades which can be moved back and forth by means of an actuating lever. For the purpose of exposure time regulation, the opening and closing motion of the actuating lever is influenceable by a braking member which can be brought into effective connection with the actuating lever and is expediently designed as pivoted wheel.

Previous photographic shutters have been provided with a stationary pivotally mounted braking wheel to obtain different exposure times. This wheel can be made to perform rotary motions by means of a separate, likewise rotatable dual-armed brake lever which can be made to engage the running-off drive member of the shutter. To regulate the braking effect, the brake lever is settable to various angular positions by means of a timing cam by which, on the one hand, it is led more or less into the path of motion of the drive member and, as a consequence thereof, the unhindered path of the drive member is altered during the opening process, while on the other hand the point of attack of the brake lever at the flywheel is moved. Due to the change of several geometric values, such as transmission ratios in the exposure time setting mechanism, several adjustent possibilities must be provided to obtain exact exposure times.

It is an object of this invention to provide a shutter, by means of which a wide range of braking times with as exact exposure times as possible is attainable by using a flywheel for exposure time regulation.

It is another object of this invention to provide such a shutter with a braking device that is simple and economically designed.

These and other objects are provided according to the invention, in that the wheel, mounted so it can pivot againts the force of a return spring, is disposed on a carrier whose relative position to the actuating lever is changeable. Further, stop edges staggered like steps are provided at the wheel to limit its amplitude of deflection. This measure makes it possible to create the conditions which enable the adaptation of the range of exposure times of a braking device equipped with a flywheel to the required extent of braking times in a simple manner while maintaining a design which is both parts-saving and requires relatively little assembly space, whereby the exposure times are attainable with the usual tolerances without special adjusting means.

A particularly expedient embodiment of the braking device according to the invention in both structural and functional respect is achievable by having a dual-armed lever with one end supporting itself against a control cam of the exposure time setter under the force of a spring and with the other end of the lever serving as a carrier for pivotally mounting the flywheel.

In a further development of the invention, the stop edges or cams provided to limit the amplitude of deflection of the flywheel are formed by appropriate mating step-shaped recesses. This measure has a beneficial effect especially from a manufacturing point of view because the wheel together with the stop edges can be manufactured in one operation. Depending on the structural design of the braking device it can also be advantageous, however, to provide strips or the like laterally attached to the flywheel as stop edges.

Various other objects, features and advantages of this invention will be apparent from the following specification, claims, and the drawings appended hereto wherein:

FIGURE 3 is a view of the winding and driving mechanism of the shutter of FIGURE 1 at the end of the winding motion before the opening of the shutter blades.

FIGURE 4 is a view similar to FIGURE 3 with the parts shown in a position corresponding to the opening of the shutter blades.

FIGURE 5 is a fragmentary view of the shutter of FIGURE 1 with the flywheel and the shutter blade actuating lever which, after reversal to exposure time $t_3$, are interconnected and with the shutter illustrated in rest position.

FIGURE 6 is a view similar to FIGURE 5 with the parts in the open position.

FIGURE 7 is a fragmentary view of the shutter of FIGURE 1 set to exposure time $t_2$.

FIGURE 8 is a view similar to FIGURE 7 illustrating the flywheel and the actuating lever in the open position.

FIGURE 9 is a fragmentary view of the shutter of FIGURE 1 set to exposure time $t_1$.

FIGURE 10 is a view similar to FIGURE 9 illustrating the flywheel and actuating lever in the open position.

Figure 1:
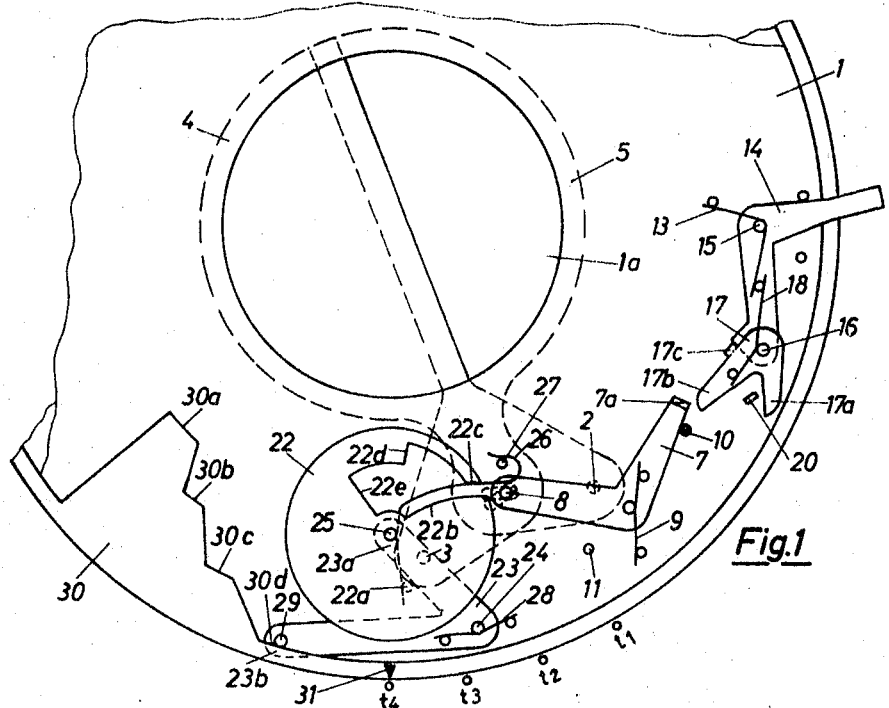
FIGURE 1 is a fragmentary top view of the shutter of this invention in normal position, with braking weight disconnected to achieve the shortest exposure time $t_4$.

Referring now to the drawings there is illustrated a self-winding shutter having a base plate, designated by the reference numeral 1, with pins 2 and 3 pivotally mounting two shutter blades 4 and 5, respectively, which are movable back and forth to cover an exposure aperture 1a machined in the base plate in their normal position. Both shutter blades 4 and 5 are in pin-slot connection with a drive pin 8 disposed on a pivotally mounted actuating lever 7. The two shutter blades 4 and 5 are kept in closed position by a return spring 9 which tends to hold the shutter blade actuating lever 7 in contact with a pin 10 fastened in the base plate 1. In the open position of the shutter blades 4 and 5 the actuating lever 7 is adapted to abut against another fixed pin 11.

A dual-armed winding and release lever 14 is mounted on a fixed pin 15 and influenced by a return spring 13, and is provided to drive the shutter blade actuating lever 7 having a cantilever 7a. While one end of the winding and release lever 14 can be actuated by the photographer, its other end has a driving pawl 17 pivoted thereon by means of a pin 16. This driving pawl 17 has two arms 17a and 17b, disposed at an angle, and is biased against the winding and release lever 14 by means of a tab 17c under the influence of a relatively strong wound spring 18. While a stop 20, fastened to the base plate 1 and equipped with a beveled upper edge, is assigned to arm 17a of the driving pawl 17, the other arm 17b is adapted to cooperate with the cantilever 7a of the actuating lever 7.

According to the disclosed embodiment, exposure times of varying duration are achievable with the above described shutter arrangement. For this purpose a brake member 22, expediently designed as wheel, is provided which, against the force of a return spring, pivots on a carrier whose relative position to the actuating lever 7 is changeable and which wheel can be made to engage the actuating lever 7 and is further equipped with stop edges, staggered like steps, to limit its amplitude of deflection. A dual-armed angularly designed lever 23 pivoted on a fixed pin 24 serves as a carrier for the flywheel 22. The flywheel 22 is mounted on an arm 23a of the angular lever 23 by means of a pin 25. Further, laid around pin 25 is a return spring 26 with one leg engaging a pin 22a of the flywheel 22 thereby keeping the flywheel 22 biased relative to the arm 23a of the angular lever 23. In accordance with the respective setting of the angular lever 23, either a fixed pin 27 or the drive pin 8 of the actuating lever 7 can serve as counter-bearing for the other end of the return spring 26 expediently of hook-shaped design.

The other arm 23b of the angular lever 23, loaded by a spring 28, cooperates by means of a pin 29 with a setter 30 which, in the disclosed embodiment, is designed as a ring and pivots on the base plate 1. The setter 30 has a control cam formed, for example, by steps 30a, 30b and 30c, by means of which the flywheel 22, by pivoting of the angular lever 23, is so settable relative to the actuating lever 7 that the pin 8 can engage various radii of the wheel 22. For this purpose the flywheel 22 can be provided with a recess, one side of which is limited by an approximately radially extending engaging edge 22b. Another step 30d is provided for the purpose of putting the angular lever 23 into a position so that the flywheel 22 positions itself outside of the range of motion of the actuating lever 7 or the drive pin 8. The settings into which the setter 30 can be positioned to achieve the various exposure times are indicated by the general markings $t_1$ to $t_4$, and a setting mark 31 is provided on the setter 30 itself.

As already indicated, the flywheel 22 can be made to engage the actuating lever 7 and can be deflected by various amplitudes. For this purpose, besides the engaging edges 22b of the recess, the flywheel 22 is provided with several stop edges 22c, 22d and 22e, whose number depends on the number of steps 30a to 30c of the setter 30, and which are staggered like steps, extend radially, and upon deflection of the wheel, cooperate with the pin 8, for example. In the disclosed embodiment the stop edges are expediently formed by step-shaped recesses machined into the flywheel 22. However, strips or the like, laterally attached to the flywheel 22, can also serve as stop edges to limit its amplitude of deflection.

Figure 2:
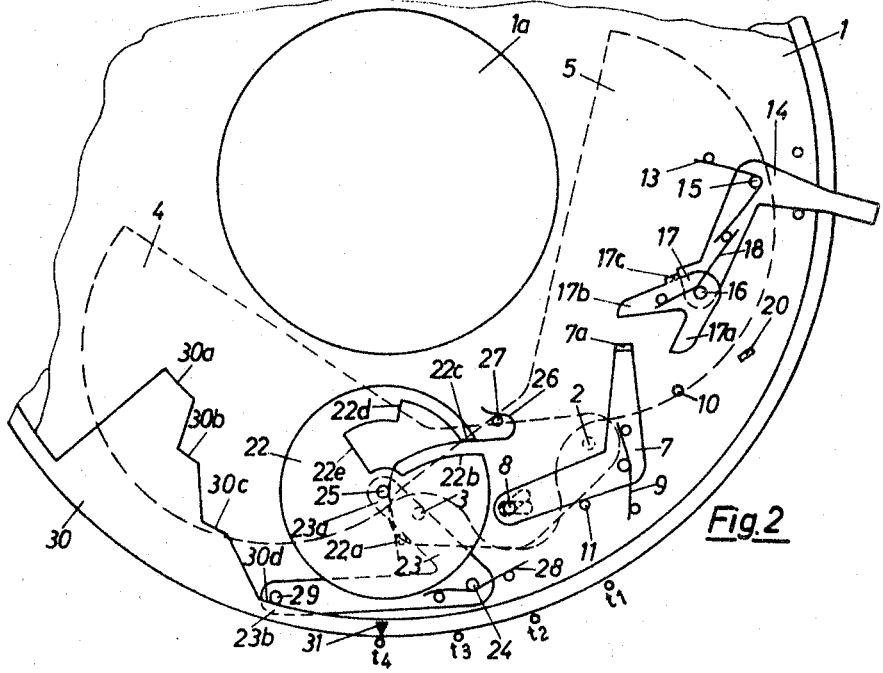
FIGURE 2 is a view similar to FIGURE 1 illustrating the shutter in the open position.

The operating mode of the arrangement described above is described in detail as follows:

When positioning the setter 30 to $t_4$ to preselect the exposure time, the flywheel 22 assumes the position with respect to the actuating lever 7 as shown in FIGURES 1 and 2, whereby the wheel 22 is kept biased relative to the arm 23a of the angular lever 23 due to the return spring 26 supporting itself against the fixed pin 27. Upon actuation of the winding and release lever 14 the latter performs a clockwise rotary motion around pin 15. Thereby, the arm 17a of the driving pawl 17 contacts the fixed stop 20, through which circumstance the pawl 17, in the further course of the rotary motion of the winding and release lever, performs a rotary motion around pin 16, aaginst the force of the drive spring 18. The drive pawl 17 finally reaches the position shown in FIGURE 3, in which the release of the pawl 17 from the fixed stop 20 is imminent. When this happens, the tension stored in the drive spring 18 is released, which rotates the drive pawl 17 clockwise around pin 16 so that the pawl 17 acts with its arm 17b upon the cantilever 7a of the actuating lever 7. The actuating lever 7 is thereby taken along as illustrated in FIGURE 4, which in turn brings the shutter blades 4 and 5 into the open position shown in FIGURE 2. Upon assuming this position, the drive pawl 17 leaves the actuating lever 7 and, under the influence of the drive spring 18, the tab 17c makes contact with the winding and release lever 14. Simultaneously, the actuating lever 7 strikes against the pin 11 and is subsequently pivoted back into its normal position as shown in FIGURE 1 by the return spring 9, taking the shutter blades 4 and 5 along into the closed position, while the winding and release lever 14 returns into its normal position upon release.

When the mark 31 is set so as to oppose the exposure time $t_3$ according to the representation in FIGURES 5 and 6, then the relative position of the flywheel 22 with respect to the actuating lever 7 is so changed, due to the pin 29 striking against the step 30c, that the drive pin 8 positions itself between the radial stop edge 22c and the engaging edge 22b of the flywheel. This connects the flywheel 22 with the actuating lever 7 in both the normal position of the shutter and during the shutter run-off. During this reversal, the hook-shaped end of the return spring 26 leaves the fixed pin 27 and supports itself against the drive pin 8 so that the flywheel 22 remains biased relative to the arm 23a of the angular lever 23. Now, when in the course of the winding and release motion the actuating lever 7 is moved counterclockwise by the drive pawl 17, the actuating lever 7, taking the flywheel 22 along, performs the above described back and forth motion with a certain retardation as compared with the previous setting for $t_4$ so that a longer exposure time is achievable in the $t_3$ setting.

By bringing the mark 31 of the setter 30 into the setting $t_2$ or $t_1$ as shown in FIGURES 7 and 9 respectively, the angular lever 23 leads the flywheel 22 more or less toward the shutter blade actuating lever 7 so that the drive pin 8 can engage the edge 22b of the flywheel 22 with a lever arm corresponding to the respective setting. In these settings, the drive pin 8 is biased against the engaging edge 22b of the flywheel 22 under the effect of the return spring 26. In the course of the winding and release process, the shutter blade actuating lever 7 is first moved counterclockwise again by the drive pawl 17, whereby the flywheel 22 is taken along synchronously by the pin 8 until the actuating lever 7 strikes the fixed pin 11. While the actuating lever 7 is kept in contact-making position with pin 11 by the return spring 26, the flywheel 22 rotates beyond the reversal point because of the kinetic energy imparted to it by the actuating lever 7 during the opening motion. The flywheel 22 rotates until it strikes against the pin 8, which is stationary at this moment, with its radial stop edge 22d or 22e as illustrated in FIGURES 8 and 10 respectively. Due to the return spring 26 supporting itself against the pin 8 and exerting a turning moment on the flywheel 22 which increases progressively in accordance with the amount of deflection, the flywheel is accelerated in the opposite direction again after striking the drive pin 8. In the course of the return motion, the edge 22b of the braking wheel 22 strikes against the pin 8 of the actuating lever 7 and returns it with the shutter blades 4 and 5 connected thereto into the normal position again in cooperation with the return spring 9. In the settings according to FIGURES 7 and 9, both the point of engagement of drive pin 8 with the edge 22b relative to the axis of rotation of the flywheel 22 and its amplitude of deflection are changed, making correspondingly longer exposure times achievable in the $t_2$ and $t_1$ settings than in the $t_3$ setting.

The invention comprises additional design possibilities, for instance, to achieve a greater range of exposure times, the flywheel can be equipped with more than three radial stop edges, and the exposure time setter can be equipped with as many steps for setting the flywheel relative to the shutter blade actuating lever. Further, the carrier for the flywheel could be designed as a slide or the like.

It will be understood that the foregoing description with the details of exemplary structure is not to be construed in any way to limit the invention, but that modificaions may be made thereto without departing from the scope of the invention as set forth in the following claims.

Having thus described my invention, I claim:

1. A self-winding photographic shutter comprising a plurality of shutter blades; an actuating lever operably connected to said shutter blades to move said shutter blades back and forth; a braking member engageable with said actuating lever to influence the opening and closing motion of said actuating lever for regulating the exposure time, said braking member being a pivotally mounted wheel rotatable against the force of a return spring, said braking member having stop edges staggered like steps to limit its amplitude of deflection; and a movable carrier mounting said braking member, said carrier being movable to change its position relative to said actuating lever.

2. The shutter of claim 1 wherein said carrier is a dual-armed lever having one end supporting itself under the force of a spring against a control cam of an exposure time setter, and wherein said dual-armed lever has its other end pivotally mounting said braking member.

3. The shutter of claim 1 wherein said stop edges provided to limit the amplitude of deflection of said braking member are in the form of mating step-shaped recesses.

4. The shutter of claim 2 wherein said stop edges are provided to limit the amplitude of deflection of said braking member in the form of mating step-shaped recesses.

5. The shutter of claim 1 wherein strips laterally attached to said braking member provide said stop edges.

6. A photographic shutter comprising shutter blade means; an actuating lever operably connected to said shutter blade means to move said shutter blade means back and forth; a braking device engageable with said actuating lever to influence the opening and closing motion of said actuating lever for regulating the exposure time, said braking device having a pivotally mounted wheel engageable with said actuating lever and a return spring biasing said wheel, said wheel being rotatable against the bias of said return spring, said wheel having stepped cam edges engageable with said actuating lever to limit the amplitude of deflection of said wheel, and a movable carrier mounting said wheel, said carrier being movable to change its position relative to said actuating lever.

7. The shutter of claim 6 wherein said carrier is a spring biased lever; and wherein said shutter has an exposure time setter with a control cam, said lever having one end biased against said control cam; and wherein the other end of said spring biased lever pivotally mounts said wheel.

8. The shutter of claim 6 wherein said stepped cam edges provided to limit the amplitude of deflection of said wheel are formed by step-shaped recesses.

9. The shutter of claim 7 wherein said stepped cam edges provided to limit the amplitude of deflection of said wheel are formed by step-shaped recesses.

References Cited

UNITED STATES PATENTS

| | | | |
|---|---|---|---|
| 2,893,301 | 7/1959 | Weise | 95—62 |
| 3,223,016 | 12/1965 | Rentschler | 95—63 |

NORTON ANSHER, Primary Examiner

L. H. McCORMICK, Jr., Assistant Examiner

U.S. Cl. X.R.

95—53